United States Patent
Jain et al.

(10) Patent No.: US 8,094,948 B2
(45) Date of Patent: Jan. 10, 2012

(54) PHOTO CLASSIFICATION USING OPTICAL PARAMETERS OF CAMERA FROM EXIF METADATA

(75) Inventors: Ramesh Jain, Irvine, CA (US); Pinaki Sinha, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 929 days.

(21) Appl. No.: 12/110,065

(22) Filed: Apr. 25, 2008

(65) Prior Publication Data

US 2008/0292196 A1 Nov. 27, 2008

Related U.S. Application Data

(60) Provisional application No. 60/914,544, filed on Apr. 27, 2007.

(51) Int. Cl.
*G06K 9/62* (2006.01)
(52) U.S. Cl. .......................... 382/225; 382/224
(58) Field of Classification Search .................. 382/224, 382/225
See application file for complete search history.

(56) References Cited

U.S. PATENT DOCUMENTS

| | | | | |
|---|---|---|---|---|
| 6,977,679 B2 * | 12/2005 | Tretter et al. | ............ | 348/231.2 |
| 7,555,165 B2 * | 6/2009 | Luo et al. | ...................... | 382/224 |
| 7,668,369 B2 * | 2/2010 | Yen et al. | ...................... | 382/170 |
| 7,693,870 B2 * | 4/2010 | Gotoh et al. | .......... | 707/999.107 |
| 7,970,240 B1 * | 6/2011 | Chao et al. | .................. | 382/305 |
| 2003/0198390 A1 * | 10/2003 | Loui et al. | ..................... | 382/224 |
| 2005/0128305 A1 * | 6/2005 | Hamasaki et al. | ........ | 348/207.99 |
| 2007/0103565 A1 * | 5/2007 | Xu et al. | .................... | 348/231.2 |
| 2008/0253663 A1 * | 10/2008 | Gotoh et al. | ................ | 382/225 |

OTHER PUBLICATIONS

ACD Systems, USA. ACDSee 9.0, 2006. http://www.acdsee.com.
Adobe Systems, Inc., USA. Flash Professional 8, 2007. http://www.adobe.com/products/flash/.
P. Appan and H. Sundaram. Networked multimedia event exploration. In Multimedia '04. ACM, 2004.
Apple Inc., USA. iPhoto, 2002. http://www.apple.com/iphoto/.
K. Barnard and D. Forsyth, Learning the semantics of words and pictures, in Proc. Int. Conf. Computer Vision, vol. 2, 2000, pp. 408-415.
Boutell M, Luo J. Bayesian Fusion of Camera Metadata Cues in Semantic Scene Classification. In Proc of IEEE CVPR, 2004.
Boutell M, Luo J. Photo Classification by Integrating Image Content and Camera Metadata. In Proceedings of ICPR, 2004.
Carson C, Belongie S, Greenspan H, Malik J. Blobworld: Image segmentation using expectation maximization and application to image querying. In IEEE Transactions on PAMI, 24(8):1026-1040,2002.
R. Casati and A. Varzi. Events, Stanford encyclopedia of philosophy, 2007. http://plato.stanford.edu/entries/events/.

(Continued)

*Primary Examiner* — Bhavesh Mehta
*Assistant Examiner* — Utpal Shah
(74) *Attorney, Agent, or Firm* — Shimokaji & Assoc., P.C.

(57) ABSTRACT

A method of classifying and organizing digital images utilizing optical metadata (captured using multiple sensors on the camera) may define semantically coherent image classes or annotations. The method defines optical parameters based on the physics of vision and operation of a camera to cluster related images for future search and retrieval. An image database constructed using photos taken by at least thirty different users over a six year period on four different continents was tested using algorithms to construct a hierarchal clustering model to cluster related images. Additionally, a survey about the most frequent image classes shot by common people forms a baseline model for automatic annotation of images for search and retrieval by query keyword.

18 Claims, 13 Drawing Sheets

OTHER PUBLICATIONS

Chang E, Goh K, Sychay G, Wu G. Content Based Soft Annotation for Multimodal Image Retrieval Using Bayes Point Machines. In IEEE Trans. on CSVT, 13(1):26—38, Jan. 2003.

Corel Corporation, USA. Corel Photo Album 6.0, 2007. http://www.corel.com/.

DVMMlab—Columbia University. Visualseek—a joint spaital-feature image search engine, 2007.http://www.ee.columbia.edu/In/dvmm/researchProjects/MultimediaIndexing/VisualSEEk/VisualSEEk.htm.

Eastman Kodak Company, USA. Kodak EasyShare Gallery. http://www.kodakgallery.com/.

EXIF: Exchangeable Image File Format for digital cameras: Exif Version 2.2. Technical Report, Japan Electronics and Information Technology Industries Association (2002).

Fast Search and Transfer Company, Norway. All the Web, 1999. http://www.alltheweb.com/.

Fraley. C. Algorithms for model-based Gaussian hierarchical clustering. SIAM Journal on Scientific Computing, 20:270—281, 1999.

Fraley C, Raftery A. How Many Clusters? Which Clustering Method? Answers via Model Based Cluster Analysis. The Computer Journal (1998).

Google Inc., USA. Google Search, 1998. http://www.google.com/.

Google Inc., USA. Youtube, 2005. http://www.youtube.com/.

Google Inc., USA. Google Video, 2006. http://video.google.com/.

Google Inc., USA. Picasa 2.6.0, 2007. http://picasa.google.com/.

Y. Gong, "Advancing Content-Based Image Retrieval by Exploiting Image Color and Region Features", Multimedia Systems, vol. 7, No. 6, pp. 449-457, 1999.

IPTC: IPTC—NAA information interchange model version 4. Technical Report, Comit International des Telecommunications de Presse, Version No. 4 (1999).

James Z. Wang, Jia Li and Gio Wiederhold, "SIMPLIcity: Semantics-Sensitive Integrated Matching for Picture Libraries," IEEE Transactions on Pattern Analysis and Machine Intelligence, vol. 23, No. 9, pp. 947-963, 2001.

J. Jeon, V. Lavrenko, and R. Manmatha. Automatic image annotation and retrieval using cross-media relevance models. In ACM SIGIR 2003.

David G. Lowe, "Distinctive image features from scale-invariant key points," International Journal of Computer Vision, 60, 2 (2004), pp. 91-110.

Liu X, Zhang L, Li M, Zhang H, Wang D. Boosting Image Classification with LDA based feature combination for digital photograph management. Pattern Recognition; 38(6), 887-901, 2005.

Lu Y., Hu C., Zhu X., Zhang H.J., Yang Q. A unified framework for semantics and feature based relevance feedback in Image Retrieval Systems. ACM Multimedia, 2000.

S. Paek, C. Sable, V. Hatzivassiloglou, A. Jaimes, B. Schiffman, S. Chang, and K. McKeown, "Integration of visual and text-based approaches for the content labeling and classification of photographs," in Workshop on Multimedia Indexing and Retrieval, 1999.

Photography—Digital still cameras—Determination of exposure index, ISO speed ratings, standard output sensitivity, and recommended exposure index. ISO 12232:2006.

Platt J. AutoAlbum: Clustering digital photoghs using probabilistic model merging IEEE CAIVL, 2000.

Russell B, Torralba A, Murphy K, Freeman W. LabelMe: a database and web-based tool for image annotation. MIT Al Lab Memo AIM-2005-025, Sep. 2005.

Schwarz G. Estimating the dimension of a model. The Annals of Statistics, 6:461-464, 1978.

Smeulders A, Worring M, Santini S, Gupta A, Jain R. Content Based Image Retrieval at the End of the Early Years. In Proc IEEE Trans PAMI, vol. 22, pp. 1349-1380, 2000.

Szummer M, Picard R. Indoor Outdoor Image Classification.In Proc of IEEE Intl workshop on Content based Access of Image and Video Databases, 1998.

Tuffield M, Harris S, Dupplaw D, Chakravarthy A, Brewster B, Gibbins N, O'Hara K, Ciravegna F, Sleeman D, Shadbolt N, Wilks Y. Image Annotation with Photocopain. In International Workshop on Semantic Web Annotationsfor Multimedia (SWAMM), 2006.

Vailaya A, Figueiredo M, Jain A.K., Zhang H. Content Based Hierarcical Classification of Vacation Images. In Proc. IEEE Multimedia Computing and Systems, Jun. 1999 (518-523).

W3C. Synchronized multimedia integration language (SMIL 2.0), Aug. 2001.

W3C. Web services description language (WSDL) 1.1. W3C Note 15, Mar. 2001. http://www.w3.org/TR/wsdl.

W3C. Scalable Vector Graphics (SVG) 1.2 Speci_cation, Oct. 2004. http://www.w3.org/TR/2004/WD-SVG12-20040510/.

Y. Wang and Y. Wang. Cognitive models of the brain. In Int. Conf. on Cognitive Informatics. IEEE, 2002.

L. Wenyin, Y. Sun, and H. Zhang. MiAlbum—a system for home photo managemet using the semi-automatic image annotation approach. In Multimedia '00. ACM, 2000.

U. Westermann and R. Jain. Toward a common event model for multimedia applications. IEEE Multimedia, 14(1), Jan.-Mar. 2007.

Yahoo! Inc., USA. Yahoo! Search, 2003. http://search.yahoo.com/.

Yahoo! Inc., USA. Flickr, 2004. http://www._ickr.com/.

Yahoo! Inc., USA. Yahoo! Photos, 2006. http://photos.yahoo.com/.

www.qbic.almaden.ibm.com.

www.virage.com.

http://www.luminous-landscape.com/tutorials/understanding-series/dof.shtml.

Boutell, M. and Luo, J. A Generalized Temporal Context Model for Semantic Scene Classification. IEEE Computer Society, 2004.

* cited by examiner

THE LAYERED STRUCTURE IN IMAGES

THE SUCCESSIVE F-NUMBERS IN A CAMERA AND THE APERTURE SIZES.

FOCAL LENGTH AND FIELD OF VIEW (A) WITHOUT CONTEXT DATE  (B) WITH CONTEXT INFORMATION
BAYES NET MODEL OF IMAGES

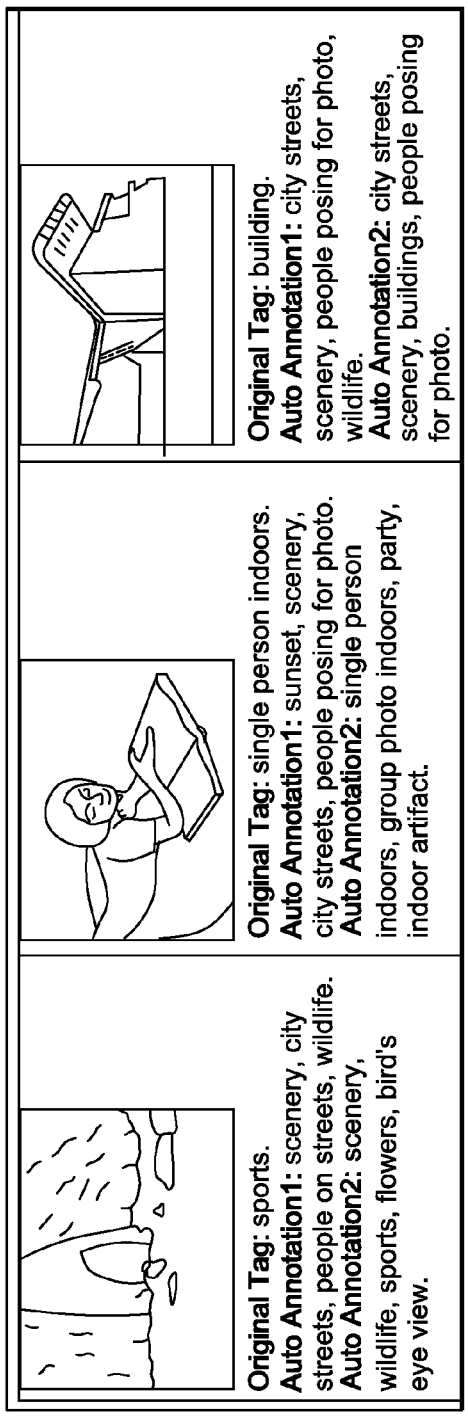
FIG. 14 MANUAL AND PREDICTED TAGS: SET 1
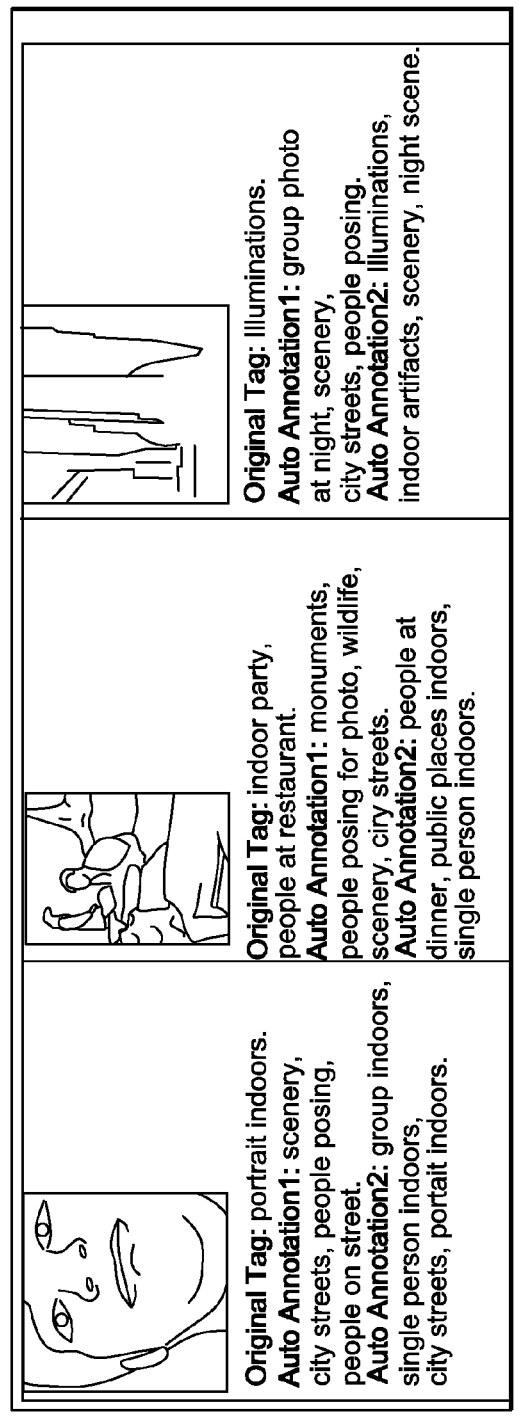
FIG. 15 MANUAL AND PREDICTED TAGS: SET 2

| IMAGES | CLASSES PREDICTED (TABLE 2) |
|---|---|
| 205  | OUTDOOR NIGHT, PEOPLE IN RESTAURANTS, THEATER, STAGE SHOW, TALK BY SPEAKER, PORTRAIT AT NIGHT, PUBLIC INDOOR PLACES |
| 210  | DAILY LIFE INDOORS, FURNITURE, PARTY AT DAY, VIEW OF ROOMS, GROUP PHOTO, PEOPLE IN FRONT OF BUILDING |
| 215  | LANDSCAPE/NATURE, SINGLE PERSON OUTDOORS, DAILY LIFE OUTDOORS, SKY, POSTER/WHITEBOARD, BIRD'S EYE VIEW, SUNSET, OCEAN/LAKE, SILHOUETTE. |
| 220  | FIREWORKS, MOONLIT SCENE, NIGHT ILLUMINATION, GROUP OF PEOPLE OUTDOOR NIGHT, SPORTS, SCENERY |
| 225 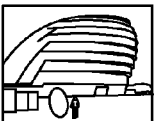 | DAILY LIFE OUTDOORS, POSTER/WHITEBOARD, SUNSET, STREET IN CITY, PUBLIC PLACES OUTDOORS, OUTDOORS PARTIES, OUTDOOR DECORATIONS/SCULPTURE, ARCHITECTURE, PEOPLE IN FRONT OF BUILDINGS |
| 230  | STREET, PUBLIC PLACES OUTDOORS, SKY, OUTDOOR DECORATIONS, ARCHITECTURE, THEATER, PEOPLE IN PUBLIC PLACES |
| 235  | DAILY LIFE INDOORS, SIGNBOARD, VIEW OF ROOMS, SLIDES/DISPLAYS, GROUP OF PEOPLE, PEOPLE IN PUBLIC OUTDOOR PLACES |

TABLE 2: ANNOTATIONS OF UNTAGGED IMAGES

FIG. 18

PHOTO CLASSIFICATION USING OPTICAL PARAMETERS OF CAMERA FROM EXIF METADATA

CROSS-REFERENCE TO RELATED APPLICATION

This application claims benefit under 35 U.S.C. §119(e) of U.S. Provisional Application having Ser. No. 60/914,544 filed on Apr. 27, 2007, which is hereby incorporated by reference herein in its entirety.

BACKGROUND OF THE INVENTION

The present invention relates generally to organizing digital files and in particular, to organizing digital photos using optical parameters stored in camera metadata.

Much of the research in content based image classification and retrieval has focused on using two types of information sources: the pixel layer of an image and text present along with an image. It is known in the art of image retrieval systems to use various measures on the image features such as, color, texture, or shape. Other methods search images for local features such as edges, salient points, or objects. Algorithms have also been proposed which find scale and rotation invariant distinctive feature points in an image. These systems help in image matching and query by example. But image search using an example or low level features might be difficult and non-intuitive to some people. Rather image search using keywords has become more popular nowadays.

The prior art has used mapping on low level image features to semantically classify coherent image classes. It is known to use an algorithm on color and texture features to classify indoor outdoor images. One publication, "Content Based Hierarchical Classification of Vacation Images". In Proc. IEEE Multimedia Computing and Systems, June 1999 (518-523), by Vailaya et al. discloses uses of a hierarchical structure to classify images into indoor-outdoor classes; then outdoor images into city and landscape. Other applications, such as image search engines rely on text, tags, or annotations to retrieve images.

Research using the annotations/tags or text accompanying an image in the prior art has been used to derive the human meta information from text accompanying the image. As disclosed in "Integration of visual and text-based approaches for the content labeling and classification of photographs" by Paek et al., they then combine the image features and text labels to classify photographs.

In some of the prior art, human agents are used to tag some images using predefined tags. An algorithm then predicts some tags on untagged images. This approach suffers from the fact that it is non trivial to define particular image classes especially for large heterogeneous image databases. Some may find that tagging an image to a particular class depends on the user's perception on a particular image.

Other prior art approaches have used the Optical Meta layer to classify and annotate images. Some use this layer to help improve classification using the pixel layer such as by using pixel values and optical metadata for sunset scene and indoor outdoor classification. Such approaches may choose the most significant cue using K-L divergence analysis. Others use a color, texture and camera metadata in a hierarchical way to classify indoor and outdoor images. But indoor-outdoor are considered by some very broad classes to actually help in any annotation or retrieval. Also these approaches lack the use of any strong reference to physics of vision (of why the images were being classified using the chosen cues). Further, the training sets used in the research have been artificially created for a specific purpose only.

As can be seen, there is a need for an improved method of classifying digital images for organization and retrieval that exploits inherent optical parameters for intuitive grouping by extracting similar optical features. Furthermore, it can be seen that a need exists for a method that automatically annotates digital images based on similar optical features.

SUMMARY OF THE INVENTION

In one aspect of the present invention, a method for classifying digital images comprises clustering optical parameters of the digital images into a set of meaningful clusters, associating the set of meaningful clusters to a set of associated classes used by a user, and classifying the digital images according to the set of associated classes.

In another aspect of the present invention, a method for organizing digital images comprises deriving optical parameters from the digital images, accessing a set of subject classes commonly used by a user and assembled into predefined parameters, determining what the user was trying to capture in the digital image by associating the derived optical parameters with the set of digital image subject classes, and organizing the digital images into classifications according to the associations determined by the derived optical parameters.

In yet another aspect of the present invention, a method for using optical metadata of a digital image to classify the digital image comprises analyzing the optical metadata to find clusters of digital images having similar optical concepts, comparing the clusters with human induced classes and corresponding the human induced classes with a classification for the digital image.

These and other features, aspects and advantages of the present invention will become better understood with reference to the following drawings, description and claims.

BRIEF DESCRIPTION OF THE DRAWINGS

FIG. 14 is a set of annotated images with manual and predicted tags;

FIG. 15 is a set of annotated images with manual and predicted tags;

FIG. 18 is a table depicting predicted annotations for untagged images.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
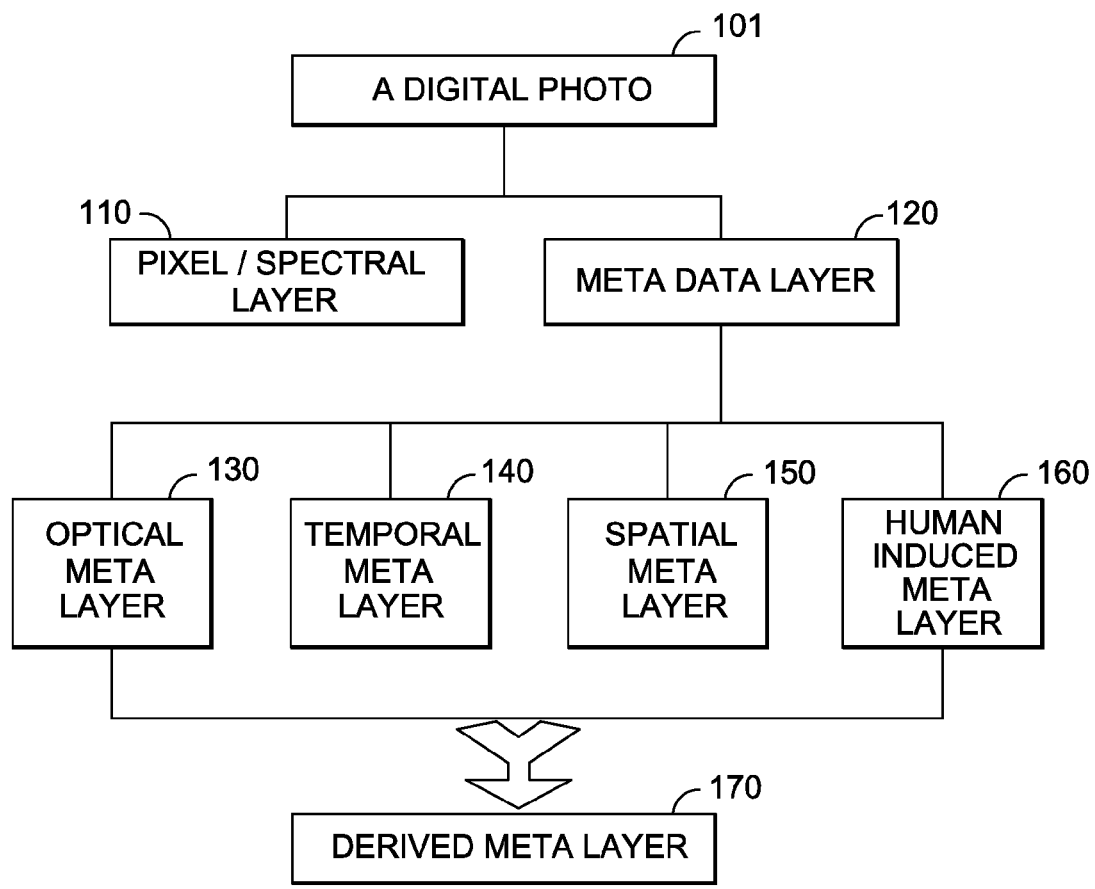
FIG. 1 is a block diagram showing a layered digital image structure according to the present invention.

The traditional camera records information (coming through the incident light) on films using chemical symbols. The digital camera has CCD/CMOS image sensors which capture visual signals and store them in the electromagnetic memory. But apart from visual signal, the digital camera stores other context information too. Hence, referring to FIG. 1, an exemplary multilayered structure of a digital photograph 101 may be proposed. The layers are i. Pixel/Spectral layer 110 and ii. Meta Layer 120. The pixel layer 110 may contain the information recorded by the CCD as pixel values. The Meta Data Layer may have the following sub layers: a. Optical Meta Layer 130; b. Temporal Meta Layer 140. c. Spatial Meta Layer 150; d. Human Induced Meta Layer 160; and e. Derived Meta Layer 170. The optical meta layer 130 may contain the metadata related to the optics of the camera; e.g., the focal length, aperture, exposure time etc. These metadata contain important cues about the context in which the image was shot (like the lighting condition, depth of field and distance of subjects in the image). The temporal meta layer 140 may contain the time stamp of the instant in which the photo was shot. The time stamp of a single image in a standalone environment may not be informative enough. But in a collection of images (e.g., photo albums) the time difference can shed valuable light on the content of the images. The spatial meta layer 150 may contain the spatial coordinates of the places where pictures were shot. These coordinates are generated by the GPS systems attached to the camera. Today some off the shelf cameras do not have GPS support. This contains the tags/comments/ratings posted by people. Community tagging (in online photo albums) also helps to generate data for this layer. The Derived Meta Layer 170 metadata can be inferred from other information by learning algorithms, e.g., automatic annotation. The taxonomy defined above helps us to define the sources of information present in a digital camera image. Presently, the spectral, optical and temporal layers are present in almost all digital photographs, while the spatial, human induced and Derived Meta layers may or may not be present.

Most off the shelf digital cameras (both point and shoot and SLR (single lens reflex)) have built-in electronics to determine the outside illumination, subject distances etc. Cameras in auto mode or different preset modes (Portrait/Night etc) use these electronics to tune the camera optics and store the information in the optical meta layer 130. The present invention uses the information stored in the optical meta layer in inferring the content of an image. The present invention uses unsupervised learning algorithms to find clusters of images having similar 'optical concepts'. The clusters are then compared with human induced semantic classes to show how they correspond.

The present invention may have, as representative examples, many advantages. For example, the optical meta information is used to infer the semantic content of an image. A probabilistic model is used to express the inference. Since the information in the optical meta layer is stored as real valued numbers (obtained from sensors), it can be retrieved and processed fast. Thus an algorithm can be used in the top level of any hierarchical image classification/automatic annotation system. Additionally, rather than using optical meta data as independent tags, novel metrics may be defined dependent on multiple optical meta tags as explained by the physics of vision and camera. Unlike related image classification research, a small set of classes may not be solely considered (like indoor-outdoor or city-landscape). A survey was used to determine the most common classes amateurs like to shoot using the off the shelf digital cameras. These human-induced classes were used as semantic image concepts. Their correspondence may be shown with the clusters defined by Optical Meta layer 130. The image data set derived from the survey consists of personal photos from at least thirty different amateur users. They were shot in a completely unconstrained environment, through a time span of six years and on four different continents. Hence the data set may be considered highly heterogeneous.

Background Study on Camera Parameters

The Exchangeable Image File (EXIF) Standard specifies the camera parameters to be recorded for a photo shoot. The actual parameters recorded depend on the particular camera manufacturer. But there are certain fundamental parameters which are recorded by all popular camera models. These are exposure time, focal length, f-number, flash, metering mode and ISO. An examination of seven different camera models (Canon, Casio, Sony, Nikon, Fuji, Kodak, and Konica) showed some commonalties. All of them have these parameters in the EXIF header. In the image database of 30,000 photos, over 90% of the images have these attributes. Subject distance may be one an important optical parameter which has been used to infer the image content. However it showed up only present in less than ten percent of the images. These parameters help capture the information related to the intent of the photographer. This intent can be inferred using parameter values and sophisticated analysis and thus, may be very effective in classification and annotation of images. In the following, descriptions of the parameters used for coding the intent are discussed and in subsequent sections, approaches to decode the intent from the parameters are developed.

Exposure Time/Shutter Speed

The time interval for which the shutter of a camera is kept open to allow the external light into the camera is known as exposure time. It is measured in seconds. Exposure time is directly proportional to the amount of light incident on the image plane. It also controls the motion blur in an image.

Aperture/F-Number

Figure 2:
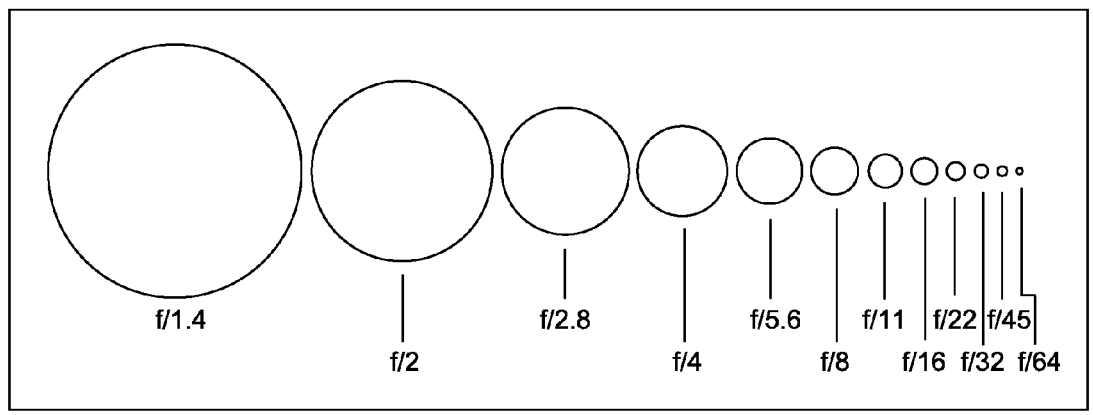
FIG. 2 is an illustration of successive F-numbers and related aperture sizes in a camera.

Referring to FIG. 2, aperture relates to the size of the opening through which light enters a camera. This size is controlled by a diaphragm over the opening which can close in or open up. The aperture size affects the amount of light on the image plane and the depth of field. Rather than using absolute aperture diameters, photographers use relative aperture, expressed as f-numbers or f-stops. Some point and shoot cameras have some discrete values of the f-stops. Mathematically, $$F\text{-Number}=\text{Focal Length}/\text{Diameter of the aperture}$$

Generally, point and shoot cameras have some discrete values of the F-stops. Each successive f-stop halves or doubles the amount of light entering the camera.

Focal Length

Figure 3:
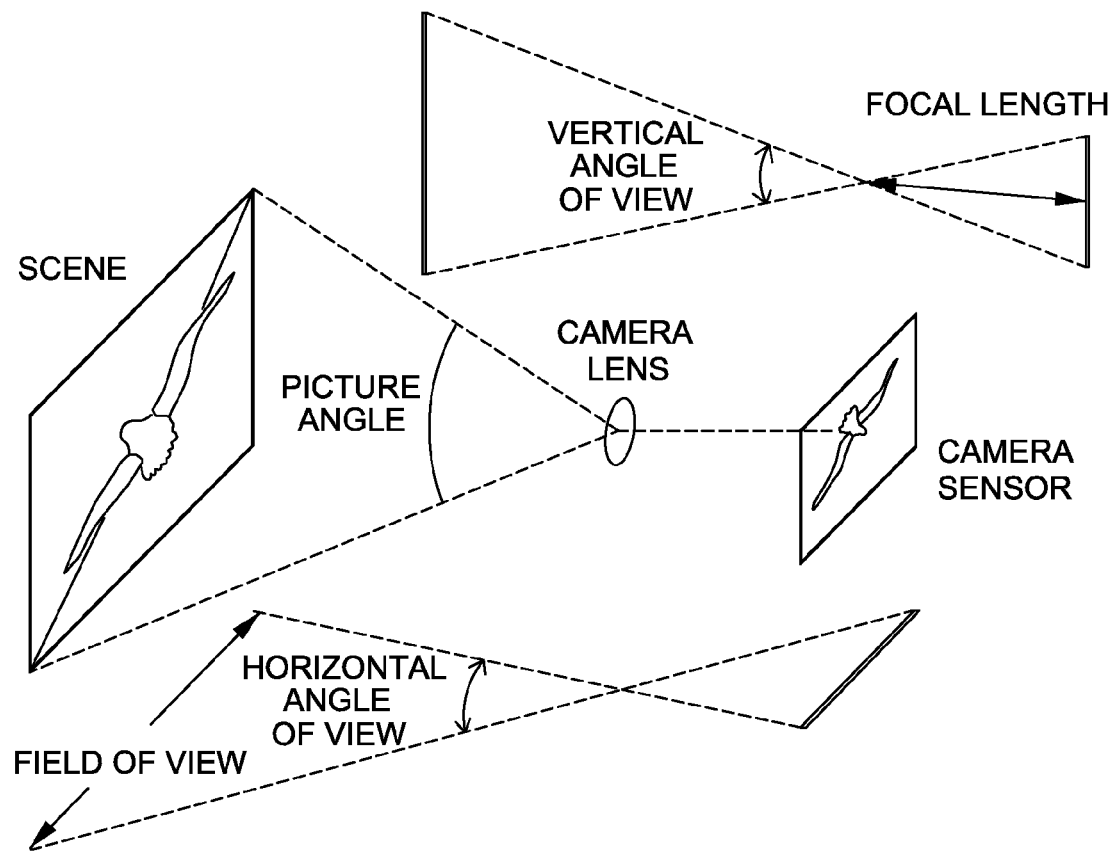
FIG. 3 is an illustration depicting focal length in relation to field of view.

With reference to FIG. 3, a focal plane is the plane where subjects at infinity are focused (by a lens). The distance between the optical center of the lens to the focal plane is known as the focal length. The field of view of the camera is determined by the focal length and the size of the camera sensor. Short focal length lens have wide field of views (wide angle) and long focal length lens have narrow field of view (telephoto). Generally, the point and shoot digital cameras have short focal lengths and small image sensors. Hence, they generally produce wide angle images. FIG. 3 depicts a general relationship between the focal length of camera lenses and their effects on field of view.

Flash

Flash is the artificial light source within a camera. Other than using the flash for a shot in dark regions, it can also be used as 'fill in flash' in bright outdoor shots. This will help to make the shadowy areas less dark and decrease contrast in lighting. Flash status (fired/not-fired) may be stored in the metadata.

Film Speed/ISO

ISO speed ratings indicate the level of sensitivity of the image sensor (CCD) towards light. In traditional film cameras, ISO sensitivity is associated with a film stock. Lower ISO films are relatively finer in grain but require more light (e.g., outdoor day shots). High ISO films (more sensitive) are required for low light or action photography; but can produce grainy images. In digital cameras ISO speed can be changed depending on circumstances without any media change. Hence the ISO speed rating of a digital camera may not be much related to the ISO rating of a film camera.

Distribution of Camera Parameters

A 30 thousand digital photograph database was created from images taken from at least thirty different users. Images were also gathered from the MIT Label Me project and the SIMPLIcity project. Most of the images were shot using point and shoot cameras and in completely unconstrained environment. Spatially, the images are from at least four different continents (North and South Americas, Europe, Asia), and temporally they span a period of six years. One goal of using such a database is to find the distribution of optical meta data in amateur photographs for help in classification and retrieval of digital images. Due to the heterogeneity of the dataset it can be inferred to model an online community photo album.

Figure 4:
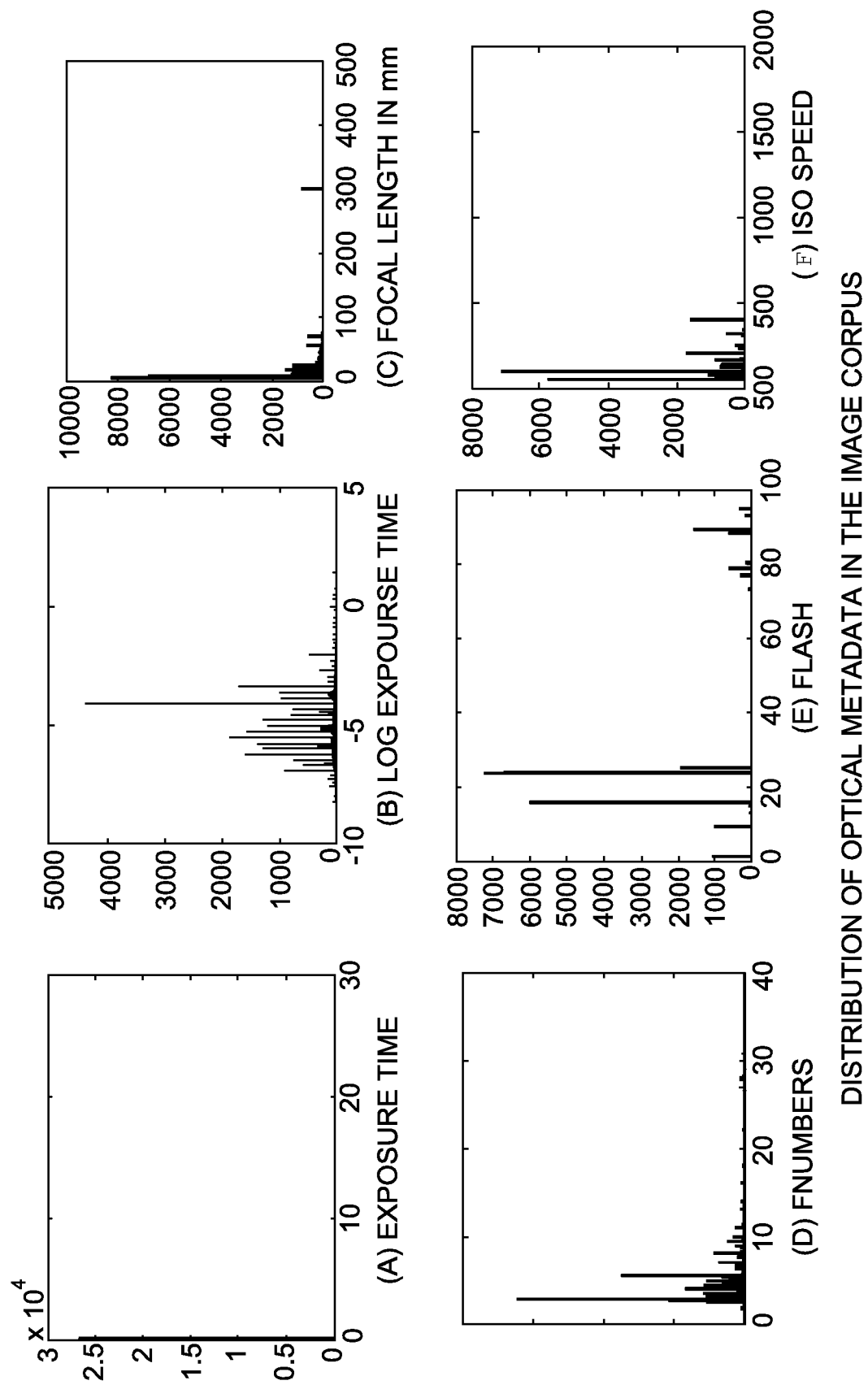
FIG. 4 is a series of graphs showing the distributions of: a: Exposure Time, b: Log Exposure Time, c: Focal Length d: F-Number, e: Flash, f: Metering Mode.

FIGS. 4(a)-4(f) show the distribution of the various parameters in the image database. Referring to FIG. 4(a) the distribution of exposure time (in sec) may be considered highly skewed. Less than one percent of the images have an exposure time of more than 0.5 second. The log-exposure time distribution is shown in FIG. 4(b). Distribution of focal length in millimeters is shown in FIG. 4(c). Since most of the images were shot by regular point and shoot cameras (which typically are wide angle with smaller relative aperture), the majority of images have a focal length in the range 0-100 mm. About 1-2% of the images have a focal length more than 100 mm. The distribution of F-Numbers is also skewed towards the lower end of the spectrum as seen in FIG. 4(d). Referring to FIG. 4(e), flash is a hex byte and its distribution shows various states of the flash, detection of reflected light and red eye detection mechanism. Most of the images have a metering mode five (multi zone). A small percentage has values 2 (spot) and 3 (center weighted average). Amateurs typically shoot photos in auto mode. The camera makes decisions on the optical parameters based on the feedback from other sensors (like light meters). One aspect of the present invention may invert this process and infer image content based on the optical parameters.

Visual Cues Extracted from Optical Parameters Amount of Incident Light

Some in the art may interpret the distributions of the optical parameters to indicate that none of the parameters have sufficient discriminative power for meaningful classification when considered independently. However, the joint distribution of the parameters may be examined for important visual cues. One important cue which is hidden in the Optical Meta layer is the amount of ambient light when a photo was shot. Exposure time and aperture size may provide a strong hint about the amount of light. The camera's response to the incident light depends on the ISO speed ratings. In traditional film cameras, a particular film stock had a predefined ISO speed rating; hence other optical parameters may be changed to take different shots with a particular film. But in digital cameras, the ISO can be changed independently from other parameters.

Figure 5:
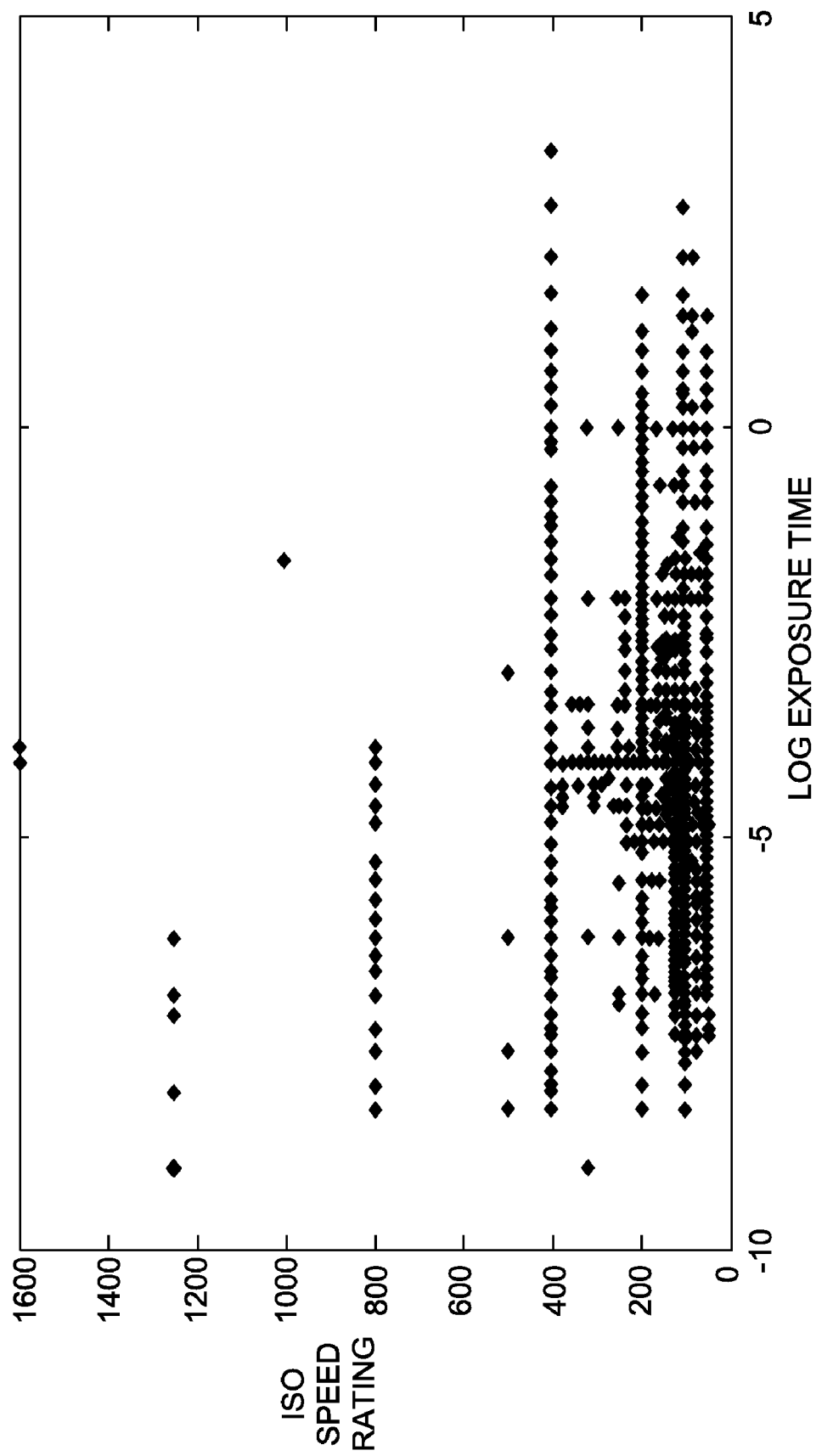
FIG. 5 is a graph showing ISO speed rating and exposure time.

Referring to FIG. 5, a chart shows ISO speed rating and exposure time are uncorrelated. To estimate the ambient lighting condition a metric may be defined based on the premise that the amount of light entering a camera is directly proportional to:

the exposure time (ET),
Area of the aperture opening (AP-Area),
ISO speed rating of the sensor (ISO).
Thus this measure can be expressed as:

$$\text{Light Metric} = ET \times AP\text{-}Area \times ISO,$$

where, the proportionality may be considered constant as 1 and the log of this value is called it the log Light Metric. Note that, log Light Metric will have a small value when the ambient light is high (the camera will have a low exposure time, small aperture and low ISO). Similarly it will have a large value if the outdoor light is small. Also the camera itself can create some artificial light using the flash. Hence one may study the distribution of this light metric separately on photographs with flash and without flash as shown in FIGS. 6(a) and 6(b).

Depth of Field (DOF)

The lens generally focuses at a particular distance (a plane) in front of the camera. All objects on the focusing plane are sharp; and theoretically objects not on the focusing plane are blurred. However, due to the constraints of the human eye, some areas in front and behind the focused subject appear acceptably sharp. This area is known as depth of field. The depth of field depends on the aperture size (diameter), the subject distance, the target size and the focal length. Decreasing the aperture diameter increases the depth of field and vice versa. Some believe that, if the target size on the image plane remains constant then DOF is independent of focal length. But to keep the target size constant over a range of focal lengths, the subject distance needs to change. Hence the photographer has to move a lot. But in normal daily shots, amateurs hardly care about maintaining a fixed target size on the image plane. Hence a longer focal length usually indicates a shallow depth of field as it flattens perspective (especially in outdoor shots). The aperture diameter can be decreased to increase the depth of field; but decreasing aperture also limits the amount of light entering the camera. To make sure a considerable amount of light enters the image plane after diffraction, the aperture opening should not be made arbitrarily small. A small target size (e.g., flowers, insects, decorative objects) will lead to lower DOF as the goal of such images is to separate the target out from the background.

Unsupervised Clustering

Unlike the prior art, the present invention derives optical parameters from digital images to model the human concept of image content. The survey indicates that classes of images in personal photo albums may be highly diverse and overlapping. It may be very difficult to come up with some predefined set of class names which are mutually exclusive and exhaustive. Further associating an image with a particular class depends on the user's perception. For example, the shot of a baby may be assigned class names such as: baby, portrait, person; the shot of people in restaurants can be assigned class names: restaurants, parties, people at dinner, etc. Thus a single image may be assigned to multiple classes by the same or different person. Also the knowledge of a particular incident may generate multiple class names like birthday party, marriage anniversary or family get-together. Hence without tagging images into a set of class names, unsupervised learning techniques may be used to find clusters of images with similar 'optical concepts'. To see how these optical concepts map to human concepts of subject image classes commonly used, surveys were performed about types of images amateurs generally shoot. Then an examination of how these human defined classes correlated with the unsupervised clusters was performed.

The Clustering Model

A hierarchical clustering method was chosen to find similar 'optical concepts' in the image database. At each level, the most important exemplary visual cue was chosen. Then, the distribution of the visual cue was modeled as a mixture of Gaussians. This has two advantages: Due to the hierarchical structure, one can infer which visual cue is affecting which clusters, and give a hypothesis on the content of the cluster. Without prior knowledge of the distribution of the optical parameters, a Bayesian Model Selection may be used to find the optimum model and Expectation Maximization (EM) algorithm to fit the model. When EM is used to find the maximum likelihood, the Bayesian model selection can be approximated by the Bayesian Information Criterion (BIC).

$$BIC=LL-NumParam/2 \times \log(N), \text{ where}$$

i. LL=Log Likelihood of the data for the Model
ii. =Log [Prob(data|Model)], and NumParam=number of independent parameters in the model. For a Gaussian mixture model, the parameters are the means and covariance. Hence, NumParam=K×(1+Dim*Dim), where K is the number of components in the mixture, N is the number of data points, Dim is the dimensionality of the variables.

Hierarchical Clustering

Light is one important visual cue in any photo. The light-content in the images may be modeled in the first level of the hierarchy. Flash is an external light source which influences the ambient light during a photo shoot. Thus, in one exemplary method of the present invention, photos may be separated with and without flash in the first level of hierarchy. In the second level, images may be clustered based on the ambient lighting condition. The LogLightMetric may be used to estimate the ambient light. Then, the hierarchical clustering algorithm may be implemented separately on these two sets.

Figure 7:
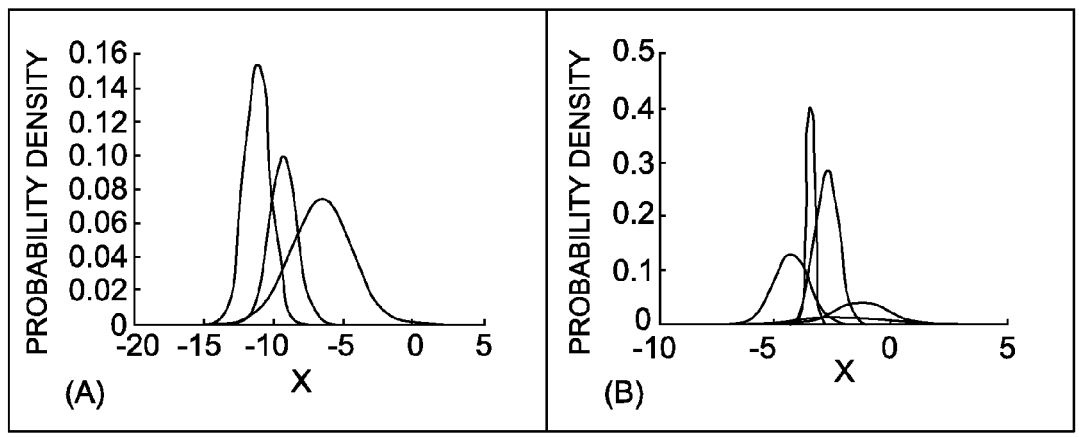
FIG. 7 is a series of graphs showing the Gaussian Mixture Models for photos without (a) and with flash (b)
Figure 8:
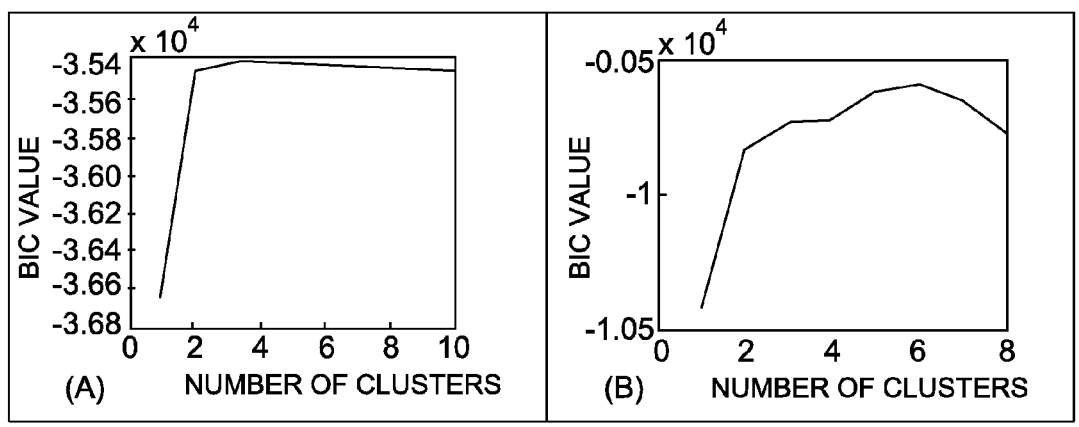
FIG. 8 is a series of graphs showing the BIC criterion values.

Clustering based on Amount of Light. The LogLightMetric was modeled using a mixture of Gaussians. The number of Gaussians were chosen based on the BIC value. Referring to FIGS. 6(a) and 6(b) respectively, the histograms of the LogLightMetric on images shot without and with flash respectively is shown. FIGS. 7(a) and 7(b) show the Gaussian clusters learned on the LogLightMetric distributions. FIGS. 8(a) and 8(b) show the BIC values for a varying number of clusters.

Clustering based on DOF. In the next level, the Depth of Field may be modeled for distribution in the images. DOF depends on the aperture size, focal length and subject distance. But only some selected camera models (two out of the seven examined) have subject distance as a separate parameter in the Optical Meta layer. Generally indoor shots have lower subject distances than outdoor shots. Further, the amount of light in indoor and outdoor images varies widely. Employing known classifications techniques using light only, one may then be able to cluster images as either outdoor or indoor.

Figure 9:
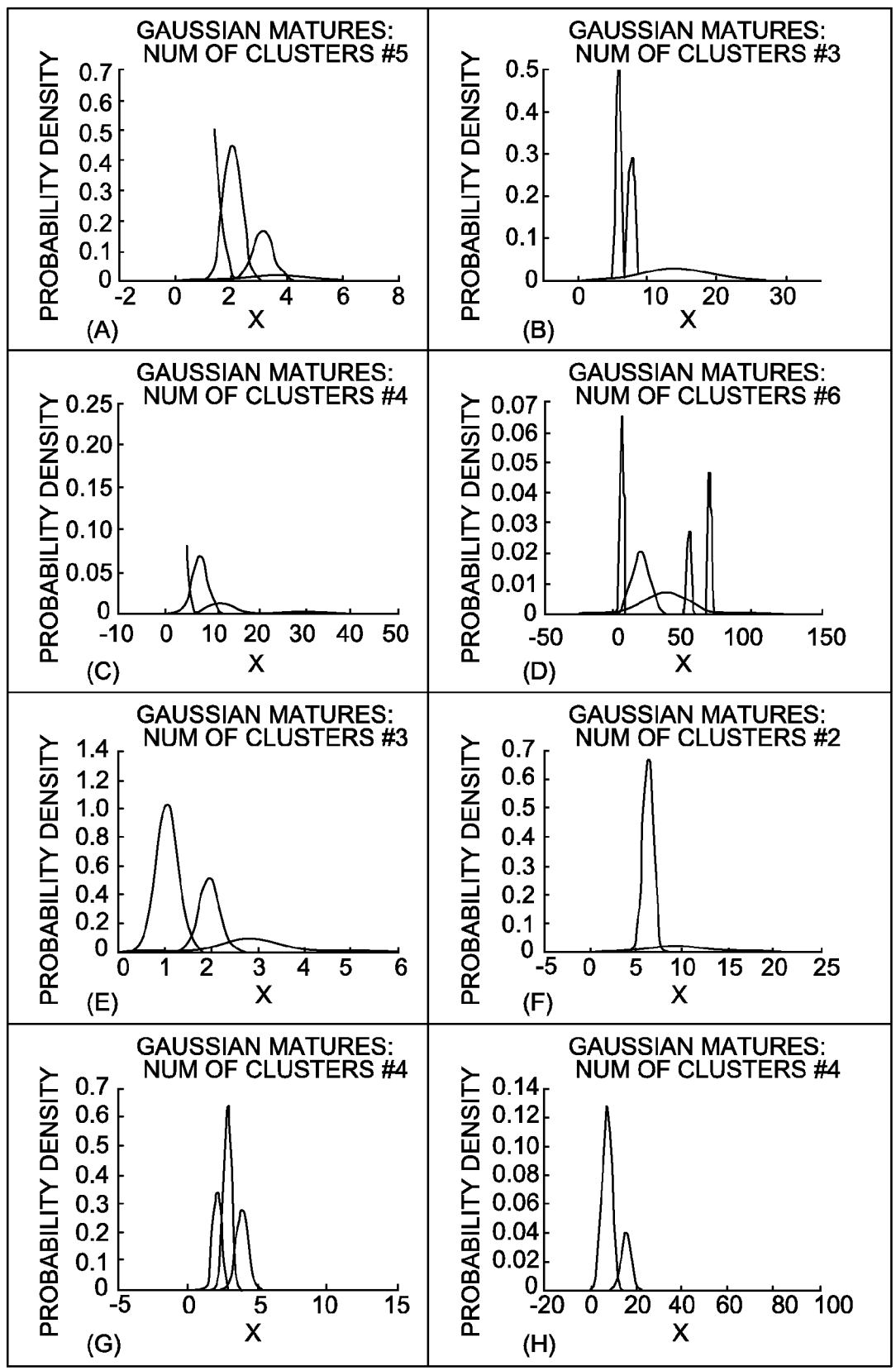
FIG. 9 is a series of graphs showing the Gaussian mixtures on aperture diameter and focal length.

Given this exemplary initial classification, the image content may be estimated using aperture diameter and focal length. In one instance, given the parameters of an indoor photo, a short focal length, and low DOF, an image may be of particular objects, portraits etc, while one with a longer focal length and shallow DOF could be of a smaller target e.g., food, indoor decorations, babies, etc. Since focal length and aperture diameter are two independent parameters (the former related to the lens and the latter related to the aperture opening), they were modeled independently as a mixture of Gaussians. Thus for a particular log-light cluster L, there are F Gaussians for focal length and D Gaussians for diameter. Hence in the second level of the hierarchy, cluster L may be further sub divided into F×D clusters. In each of the cases the number of clusters is decided by the optimal BIC value. FIG. 9 shows the diameter and focal length Gaussians on some of the selected first level clusters both from Flash Fired and Flash Not Fired sets.

Interpretation of Unsupervised Classes

Figure 10:
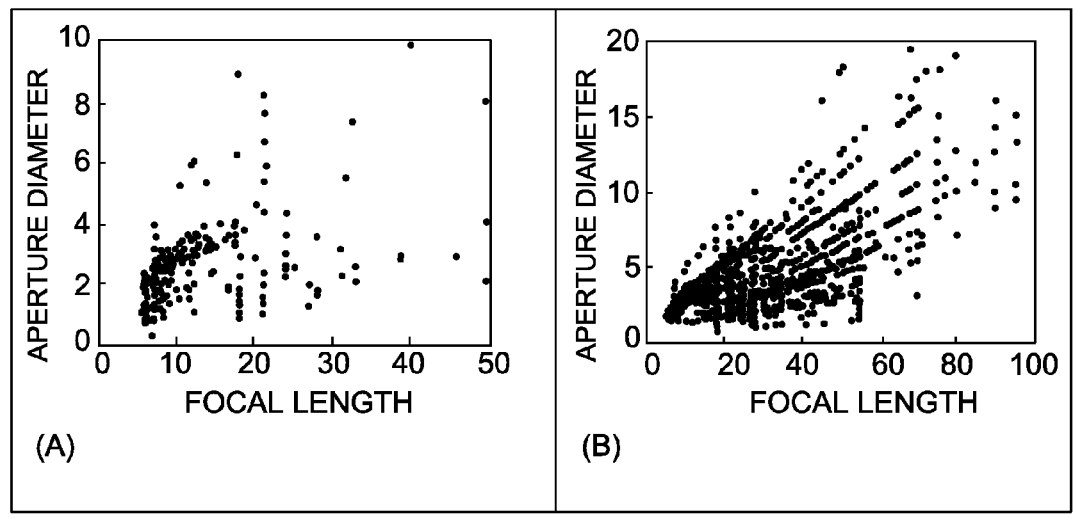
FIG. 10 shows two scatter plots of aperture diameter vs. focal length.

The 30 thousand image dataset was then divided into two parts of 20 thousand and 10 thousand images (randomly chosen). The unsupervised clustering process was used on the 20 thousand image set. The rest was kept aside for assigning class names and comparison with human induced classes. Some observations on the unsupervised clustering are as follows.

a. As discussed earlier, since Flash is a source of light which modifies the ambient light condition, images were separated out with and without flash. The hierarchical clustering algorithm may then be implemented separately on these two sets.

b. The exposure time and focal length distributions are highly skewed (FIGS. 4(a) and 4(c)). Less than 1% of the images have exposure times greater than 0.5 second. These images may then be filtered out and clustered them separately. They generally turn out to be images of night illuminations, fireworks etc. Due to the choice of the light metric, the clusters shown in FIGS. 9(a) and 9(b) represent images with differing amounts of ambient light. FIG. 9(a) represents images shot in bright light, for example, daylight while FIG. 9(b) represents images shot in low light conditions.

c. Most of the images in the dataset have been created by regular point and shoot digital cameras, which typically have wide angle lenses. FIG. 4(c) shows that photos with a focal length greater than 100 mm are highly sparse (except that there is a peak at 300 mm, which is from a stream of photos of a sporting event). Photos with high focal length were separated out and modeled independently. FIG. 10(b) shows the distribution of the diameter and focal lengths for this set. It may interest some to note that they also have a very high aperture diameter (>30 mm). This is because images with telephoto lenses have very shallow DOF. Hence the aperture diameter is high.

d. In the second level of the hierarchy, clustering was done based on the diameter and focal length distribution. Clusters with low focal length, low diameter will have wide angle images with high DOF. Clusters with high focal length and large diameter will contain images of an object zoomed into (with shallow DOF).

e. FIG. 10 shows focal length aperture diameter scatter plots for two light clusters. FIG. 10(a) is the plot for the second light cluster in images shot with flash. The vertical lines testify to the hypothesis that the focal length and diameters are independent optical parameters in camera. FIG. 10(b) is the scatter plot for the focal length versus diameter scatter plot of photos chosen from the leftmost light cluster in FIG. 7(b). It also has the sets of vertical lines. Further, some may find it interesting to see that points are arranged in straight lines of constant slope. Each of these constant slope lines correspond to an f-number (ratio between focal length and aperture). Also it is seen according to this analysis that high focal length images (>60 mm) rarely have low apertures. This may be intuitive because with high focal length people generally focus on a particular object and they need shallow DOF (high aperture) for that.

The Survey and Human Induced Classes

A survey was conducted about popular image classes generally shot by amateurs. The survey was conducted among roughly thirty people who were asked to come up with common class names they would assign to the images in their personal albums. The survey revealed that class names depend on the human perception and background knowledge of an image, for example, an image of people in a scenery can be classified as 'outdoor activities', 'hikes/trips', 'people in landscape', 'group of people' etc. From the feedback the fifty five most common class names were chosen for the study. These class labels were then assigned to two thousand images randomly selected from the 10 thousand image hold out set. Since the classes are not mutually exclusive, each image was assigned to as many classes as it seemed coherent to the person involved in tagging.

Comparison of Human Induced Classes and Unsupervised Clusters

Figure 12:
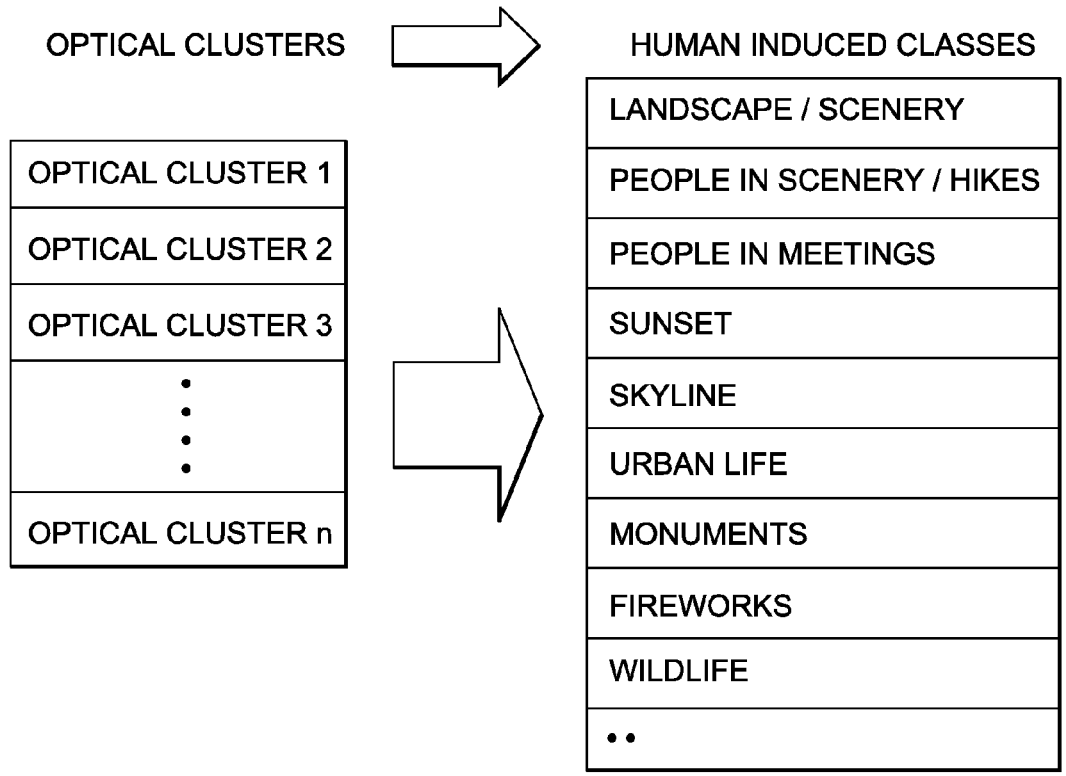
FIG. 12 shows a map of human classes to optical clusters.

With reference to FIG. 12, to evaluate the effectiveness of the optical meta layer in classification of images, the unsupervised clusters may be compared with the human induced classes. The unsupervised clusters may be called: Optical Clusters and Human Induced Class Names as Human Classes. A mapping, F was performed between these two sets showing the correspondence between the optical clusters and human classes. Further, this mapping was defined as 'soft'. Each edge between a Human Class and Optical Cluster has a weight. This weight signifies the strength of the belief of the correspondence. The weight was found by the following probabilistic framework.

Let HumClass be a discrete random variable over the set of Human Class indices, and OptClus be a discrete random variable over the set of Optical Cluster indices. Thus one may want to evaluate the conditional probability: P(HumClass|OptClus), to express the strength of correspondence between HumClass and OptClus. From the tagged dataset, there may be a set of images $D_i$ for each of the HumClass values i. Thus, $$P(HumClass \mid OptClus) = P(OptClus \mid HumClass)P(HumClass)$$

$$= P(D_i \varepsilon\, OptClus \mid HumClass_i)P(HumClass_i)$$

Thus the results can be expressed as a table of Log likelihoods between Optical Clusters and Human Classes [Table 1 which follows].

TABLE 1

Ranked human semantic concepts for each clusters.

| Optical Clusters | Human Induced Classes | | | |
|---|---|---|---|---|
| OC1 | Group of People (−2.1) | Single Person Indoors (−2.5) | Portraits of People (−3) | |
| OC2 | People At Dinner (−4.0) | Views of Rooms/Offices (−4.5) | Public Places Indoors (−7) | Talk By Speaker (−14) |
| OC3 | City Streets (−5.21) | Vehicles/Cars (−5.3) | Buildings/Architectures (−6) | Public Places Outdoors (−6.3) |
| OC4 | People In Bars and Restaurant (−6.1) | Fireworks (−7) | Theaters/Auditoriums (−8) | |
| OC5 | Daily Activities Outdoors (−1.92) | Buildings/Houses (−2.5) | People in front of Buildings (−5) | Group of People Outdoors (−7.2) |
| OC6 | Signboards (−7.2) | Poster/Whiteboards (−8.1) | Outdoor Decorations (−9.5) | |
| OC7 | Moonlit Scenes (−12) | Illuminations at Night (−13.4) | Birds Eye At Night (−16) | Stage Shows (−20) |
| OC8 | Indoor Decorations (−15) | Food (−16.2) | People at Meetings (−19.2) | |
| OC9 | Lake/Oceans (−1.37) | Mountains (−1.5) | Landscape/Scenery (−2) | People in Scenery −2.67 |
| OC10 | Sunset (−3.2) | Silhouette (−4.5) | Illuminations at Night (−10) | |
| OC11 | Wildlife (−1.83) | Sports (−3.2) | Bird's Eye View (−4.6) | Trees/Forests (−6) |

Interpretation of Results

The hierarchical unsupervised algorithm returned multiple sets of clusters. The first set is for images without flash. There are thirty three clusters in the set. Next is a set of twenty nine clusters for images with flash. There are two clusters for images with very high focal length (>100 mm) and six clusters for images with very high exposure time (>0.5 sec). Eleven optical clusters were selected and showed the most likely human induced class for each of them. Each row in the figure corresponds to an optical cluster (OC). OC1 has predominantly indoor images shots with short focal length and low DOF (people posing for photo, portraits etc). OC2 are indoor images with similar lights but longer focal length and larger DOF. OC3 is in different lighting conditions altogether. It is a cluster of outdoor objects like streets, cars and buildings. OC4 is of dark indoors like bars/restaurants or fireworks in dark outdoors. OC6 is of outdoor objects which have been focused into. OC7 is dark outdoors like moonlit scenes and illuminations or stage shows etc. OC9 and OC10 are of high focal lengths of which the ambient light in OC9 (sceneries/landscapes) is more than OC10 (sunsets). OC11 is of images with very high focal lengths (sports/wildlife etc).

Annotation of Untagged Images

To explore the robustness of the algorithm for prediction of tags in untagged images, a set of images was collected which have not been used either for building the unsupervised model or for creating the human tagged set. For each test image the probability of each of the unsupervised cluster was found. Heuristically, the first ten clusters were chosen having largest probability. Next, for each cluster, the top five human induced classes were chosen and their probability weighted with the cluster specific probability. Mathematically, the process can be expressed as:

$$P(HumClass_i | TestImage) =$$
$$\Sigma_k P(HumClass_i | OptClus_k) P(OptClus_k | TestImage).$$

P(OptClus$_k$|TestImage) can be obtained using the parameters of the Gaussian and P(HumClass$_i$|OptClus$_k$) has been generated by the tagged image set. The list may be ranked based on the conditional probability. In most cases, the probability decreases smoothly or by smaller steps until there is a sudden large drop. For example, FIG. 18 shows exemplary human induced classes for some test images until the likelihood drop. The results are presented in tabular format (Table 2) where an Image column 200 is comprised of test images that were run through the probability process and their respective annotation results can be seen in the column of Predicted Classes 300. In one test sample image, Image 1 (205), annotations such as "Outdoor Night", "People in Restaurants", "Theater", "Stage Show", "Talk By Speaker", "Portrait at Night", and "Public Indoor Places" were generated before a drop-off threshold in likelihood of connection is reached.

The Automatic Annotation Framework

Figure 13:
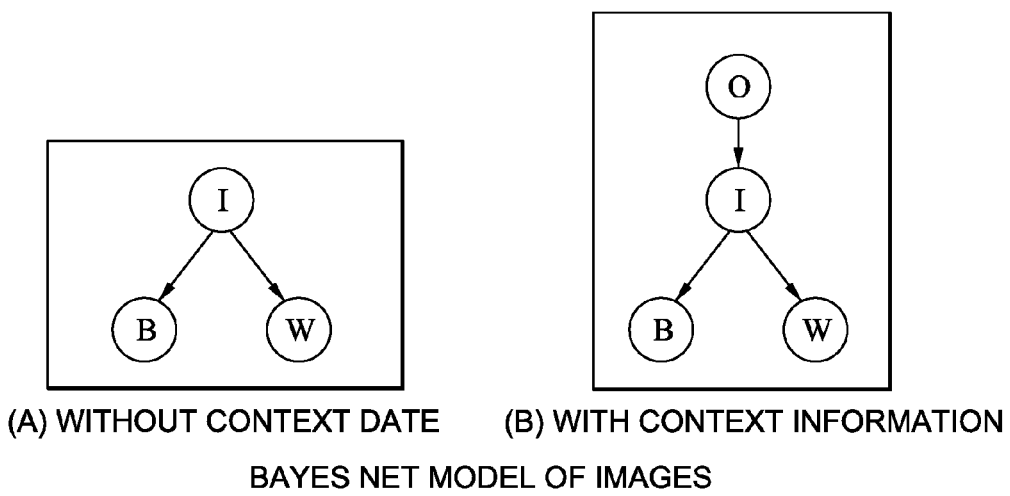
FIG. 13 shows a series of models showing a Bayes Net modeling of images.

An automatic annotation framework may be based on the relevance model approach. Referring to FIG. 13, a Bayesian network model is defined to show the interaction among content and contextual information in an image. An image (I) is treated as a bag of blocks and words generated from the same process. These blocks come from a finite set of block vocabulary and the words come from a finite set of word vocabulary. One way the blocks are generated includes dicing up each image in a training corpus into fixed sized square blocks. For each block, a number of low level features like color histogram, color moments, texture and edge histograms are computed. Assuming that a feature vector is of size (F) and there are (M) blocks in each image and (N) photos in the training corpus, a result of (MN) block scan be obtained. Using a k means algorithm on these (MN) blocks finds k representative blocks. So the out block vocabulary size is (K). One would assume all images have been generated by selecting some blobs from this vocabulary space. Hence, each image can be characterized by a discrete set of block numbers of size (M). By heuristically deriving a value for (K), for example, 500, the responses in a sample survey of thirty people who submitted common nouns for photos they shot came up with a vocabulary size of 50 words.

Referring to FIG. 13(a), a Bayes Net model is shown. Assuming a given training corpus of images (T) (not shown), each image (I)∈(T) is represented by a vector of discrete values (B) of size (M) which denote which block from the vocabulary has been used to create the image. Also associated with each image is a set of words or annotations (W). Thus, (I)=(B,W). Automatic annotation can then be used to predict the (W)s associated with an untagged image based on (B). Thus, for an untagged image, the probability of a word being assigned to the image can be computed based on (B). Let (I) be the random variable over all images in the training corpus, (B) be the random variable over the block vectors and (W) be the random variable over the words. In the Bayes Net model, (B) becomes the observed variable. The conditional probability of a word given a set of blocks is computed according to the following equation:

$$P(w|B) = \Sigma_I P(w,I|B) = \Sigma_I P(w|I,B) P(I|B) \alpha \Sigma_I P(w|I) P(B|I) P(I)$$

P(w|I) and P (B|I) can be learned from the training corpus after adequate smoothing. This would be a baseline model however; it does not consider the contextual information which is present in a digital photo. Hence, referring to FIG. 13(b), a model is proposed integrating both content and context. The content and contextual information is assigned to images in optical clusters (O) using an untagged image database. Whenever a new image (X) comes, it may be assigned to a cluster O$_j$ having a maximum value for P(X|O$_j$). Here O is a random variable over all clusters and it is observed. Thus the probability of a word in a block vector given the pixel feature blocks and the optical context information can be computed as in the following equation:

$$P(w|B,O) = \Sigma_I P(w,I|B,O) = \Sigma_I P(w|I,B,O) P(I|B,O) \Sigma_I P(w|I) P(B,O|I) P(I) = \Sigma_I P(w|I) P(B|I) P(O|I) P(I)$$

Each (O) is represented as a Gaussian cluster whose parameters are learnt using the algorithm for the clustering model.

Indoor/Outdoor Classification

To show the efficacy of the Optical Meta Layer, a two class classification problem may be solved. First, the camera parameters may be used to classify photos either as indoor shots or outdoor shots. As a baseline, the raw camera parameters (focal length, exposure time, flash, diameter, ISO value) are used. Next the latent variable LogLightMetric for classification is used. As shown in Table 3, the accuracy improves by 3% and the F-Measure improves by 5% if the latent variable is used for classification. Also one may see that the optical metadata are by themselves quite efficient in distinguishing between indoor and outdoor shots.

TABLE 3

Results of Indoor Outdoor classification using Optical Metadata only

| Type of Model | Mean Accuracy | Mean Absolute Error | F-Measure Indoors | F-Measure Outdoors |
|---|---|---|---|---|
| Raw Camera Parameters | 90.5 | 0.13 | 0.89 | 0.90 |
| LogLightMetric | 93.86 | 0.09 | 0.93 | 0.95 |

TABLE 4

Automatic Annotation on the Entire Vocabulary Set

| Type of Model | Mean Precision | Mean Recall |
|---|---|---|
| Only Content Data | 0.46 | 0.31 |
| Both Content and Context | 0.56 | 0.35 |

Next the results of automatic image annotation may be shown, first using only image features and then using both image features and optical context information. For each photo in the test set, the algorithm finds a probability distribution over the entire set of vocabulary. Heuristic techniques choose the top five words from them as the annotations for an image. If the ground truth annotations (tagged by humans) match any of the predicted annotations there is a hit, else there is an error. Precision for a particular tag is the ratio between the number of photos correctly annotated by the system to the number of all photos automatically annotated with the tag. Recall is the number of correctly tagged photos divided by the number of photos manually annotated with that tag. Table 4 shows the mean precision and mean recall for the entire set of fifty tags in vocabulary set. Table 5 following shows the mean precision and mean recall values for the twenty most popular words in an example vocabulary set (which have at least 40 representative photos in the training set). The top row shows the results for the model in FIG. 13(a) and the bottom row shows the results for the model proposed in FIG. 13(b).

TABLE 5

Automatic Annotation on the Popular Vocabulary Set

| Type of Model | Mean Precision | Mean Recall |
|---|---|---|
| Only Content Data | 0.59 | 0.46 |
| Both Content and Context | 0.76 | 0.60 |

In FIGS. 14 and 15 automatic annotations are shown on some test photos where "original tags" are the tags inserted manually. The set Auto Annotation1 are the tags predicted by the baseline model 13(a). The set Auto Annotation2 are the tags predicted by using both content and context information 13(b).

In an exemplary embodiment, context information can be used to narrow down the search space for image retrieval. Keyword based image retrieval can be done in one of two ways in a searchable environment. If all images in the database have been annotated with words from the vocabulary along with the corresponding probabilities, one can just retrieve the images having the query tag with a probability higher than a cutoff. In the other approach, one can translate the query words into image feature space. Since a joint distribution between blocks and words may be already learned, the most likely block vector can be found given query word(s). This blob vector may be used to find the most likely photos. In both cases searches may be through the entire image database or using the optical metadata under another embodiment of the present invention, the retrieval engine may be guided to particular clusters.

Optical clusters previously generated (for example, those shown in FIGS. 6 and 7) may be used as representative clusters. One advantage is that these clusters can be computed with minimal computational resources and can be readily interpreted. The tagged photo set was divided into training and test sets. For each photo in the training set the most likely Gaussian cluster was found and assigned all the tags of this photo to that cluster. So after iterating through the entire training set, there is a joint distribution between the tags and optical clusters. Then for each word, clusters were chosen which contribute to the top P % of its probability mass. These clusters were marked as the only ones generating all the photos with the tag. For each tagged image in the test set the most likely cluster was found. Experiments with forty different random samples of training and test images were performed. For P=70%, only 30% of the entire image database needed scanning (assuming that each cluster has equal weight in the image space). The errors on all the images and tags on the test set were computed. Table 6 shows the mean errors for some tags across all test samples. The mean average error for all tags across forty different samples is 0.18.

TABLE 6

Mean Errors for Search

| Tag | Mean Error |
|---|---|
| Buildings/Monument | 0.14 |
| Sunset | 0.15 |
| Illuminations | 0.15 |
| Beach | 0.28 |
| Indoor Group Photo | 0.10 |
| Vehicle | 0.14 |
| Indoor Artifacts | 0.27 |

Decrease in Search Space

Figure 11:
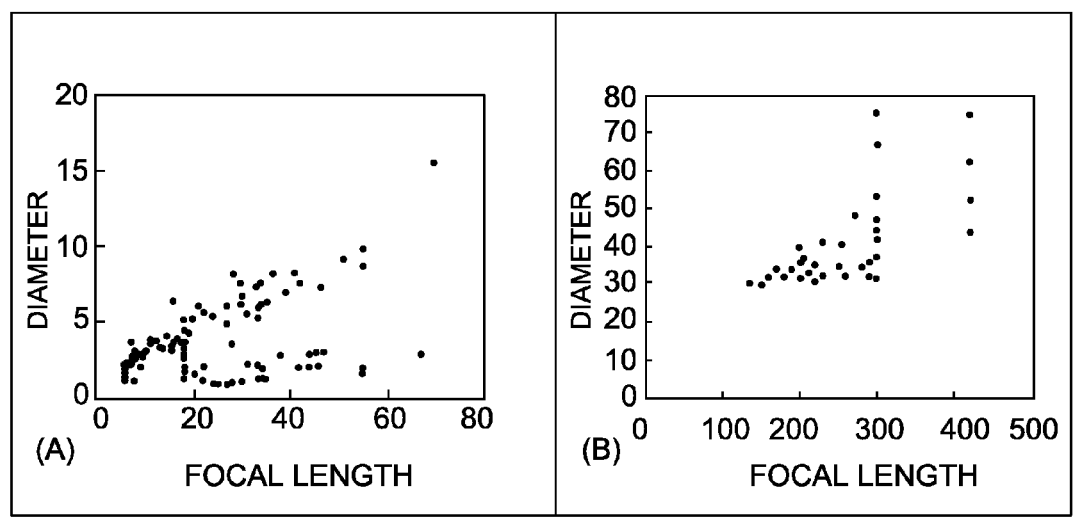
FIG. 11 shows two scatter plots of aperture diameter vs. focal length.

The inferences obtained using the Optical Meta Layer in the present invention can significantly decrease the space for image search. The proposed exemplary algorithms could be used in the top level of a hierarchical retrieval algorithm. This can improve the efficiency by decreasing the search time and also remove false positives by guiding the algorithm to the relevant clusters. For instance, the pixels in a photo of a garden and in a photo of an outdoor sporting event (in a field) may be very much the same. It might be difficult to distinguish them using color histograms. But the optical parameter 'focal length' will guide the retrieval algorithm in the correct clusters, as the focal lengths of these two types of images are likely to vary widely. For instance, some human induced classes were chosen and their distribution over a set of optical clusters was found as seen in FIG. 11. The horizontal axis denotes the focal length index of Optical Clusters. The ambient light in clusters decreases from left to right on the horizontal axis. The DOF changes in cycles on the horizontal axis.

Figure 16:
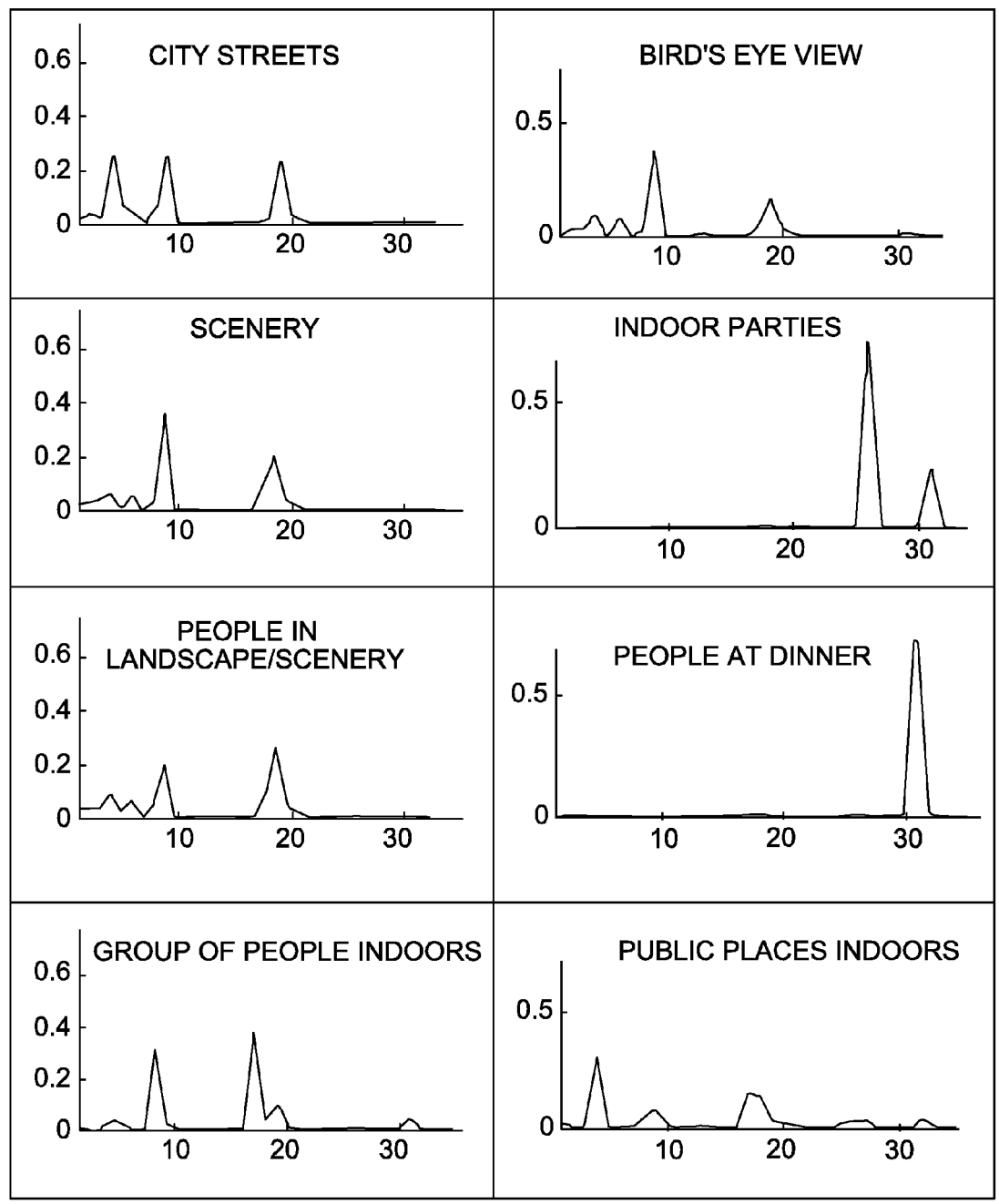
FIG. 16 shows a series of graphs describing the distribution of human induced classes over optical clusters.

This is due to the multimodal nature of the distributions. For instance, referring to FIG. 16, the photos for city streets can be shot in different lighting conditions, but they may have same DOF distribution. The peaks correspond to different lights but similar DOF. As another example, indoor parties/people at dinner are typically shot in low light condition. This may explain the peaks towards the right end of the spectrum. 'Public places indoors' is a broad class. Hence the classes are spread throughout the spectrum.

Next the top optical clusters were selected which together contribute to 85% of the mass for a particular human induced class. In the following Table 7, the ratio of the total weight of these clusters is shown relative to the entire search space. The ratio was found separately for spaces of photos with flash and for photos without flash. For most of the image classes the search space was narrowed down to 30-40% of the entire space using optical meta data alone. Most of the classes related to nature or outdoor city life (landscape, city streets, mountains etc) are found concentrated in the images without flash. Portraits are generally shot in bright lights and not in dark nights. Hence the distribution of portraits in the set of images with flash is low. Wildlife photos are shot with high focal lengths (which were modeled separately and are not shown here). This may explain their low concentrations in both the image sets. Certain classes of images (people at dinner, group photos at night, and various night scenes) are more likely to be shot with flash. This explains their concentration in the set of images with flash. Some classes of photos can be pretty broad and can be shot both with and without flash. These include indoor parties/special occasions, night life, illuminations, public places indoors (theaters, auditorium).

TABLE 7

Search space decrement for human image concepts

| Class Names | Fraction of Image Space W/O Flash | Fraction of Image Space With Flash |
|---|---|---|
| City Streets | 0.20896 | 0.066552 |
| Building/Architecture | 0.244246 | 0.068718 |
| Scenery/Landscape | 0.362119 | 0.042299 |
| People in Scenery | 0.42766 | 0.340374 |
| Oceans/Lakes | 0.362119 | 0.045448 |
| Mountain | 0.330615 | 0.040133 |
| Portraits Indoors | 0.261055 | 0.032708 |
| Portraits Outdoors at Day | 0.240372 | 0.052366 |
| Group Photo Indoors/at Night | 0.202701 | 0.341745 |
| Group Photo Outdoors at Day | 0.42766 | 0.027392 |
| People on Streets | 0.253875 | 0.068718 |
| People in front of Building/Architecture | 0.364461 | 0.372224 |

TABLE 7-continued

Search space decrement for human image concepts

| Class Names | Fraction of Image Space W/O Flash | Fraction of Image Space With Flash |
| --- | --- | --- |
| Flowers/Plants | 0.235974 | 0.052366 |
| Wildlife | 0.121561 | 0.021597 |
| Trees | 0.360587 | 0.025947 |
| Bird's Eye View | 0.365993 | 0.006289 |
| Furniture/Appliances | 0.25317 | 0.027392 |
| Pets | 0.230677 | 0.047504 |
| Indoor Daily Life | 0.246327 | 0.034874 |
| Indoor Decorations | 0.365706 | 0.034874 |
| Views of Rooms | 0.182711 | 0.027392 |
| Illumination at Night | 0.396726 | 0.33838 |
| Garden | 0.267731 | 0.029787 |
| Indoor Parties/Special Occasions | 0.039203 | 0.302586 |
| Public Places Indoors | 0.268222 | 0.034874 |
| Sunset | 0.336539 | 0.021368 |
| Sky | 0.220874 | 0.032708 |
| Silhouette | 0.312646 | 0.044176 |
| Beach | 0.266012 | 0.063015 |
| Outdoor Decorations | 0.356489 | 0.032708 |
| People at Dinner | 0.009253 | 0.032708 |
| Public Places Indoors | 0.298612 | 0.33838 |
| Night Scenes | 0.329343 | 0.475733 |

Figure 17:
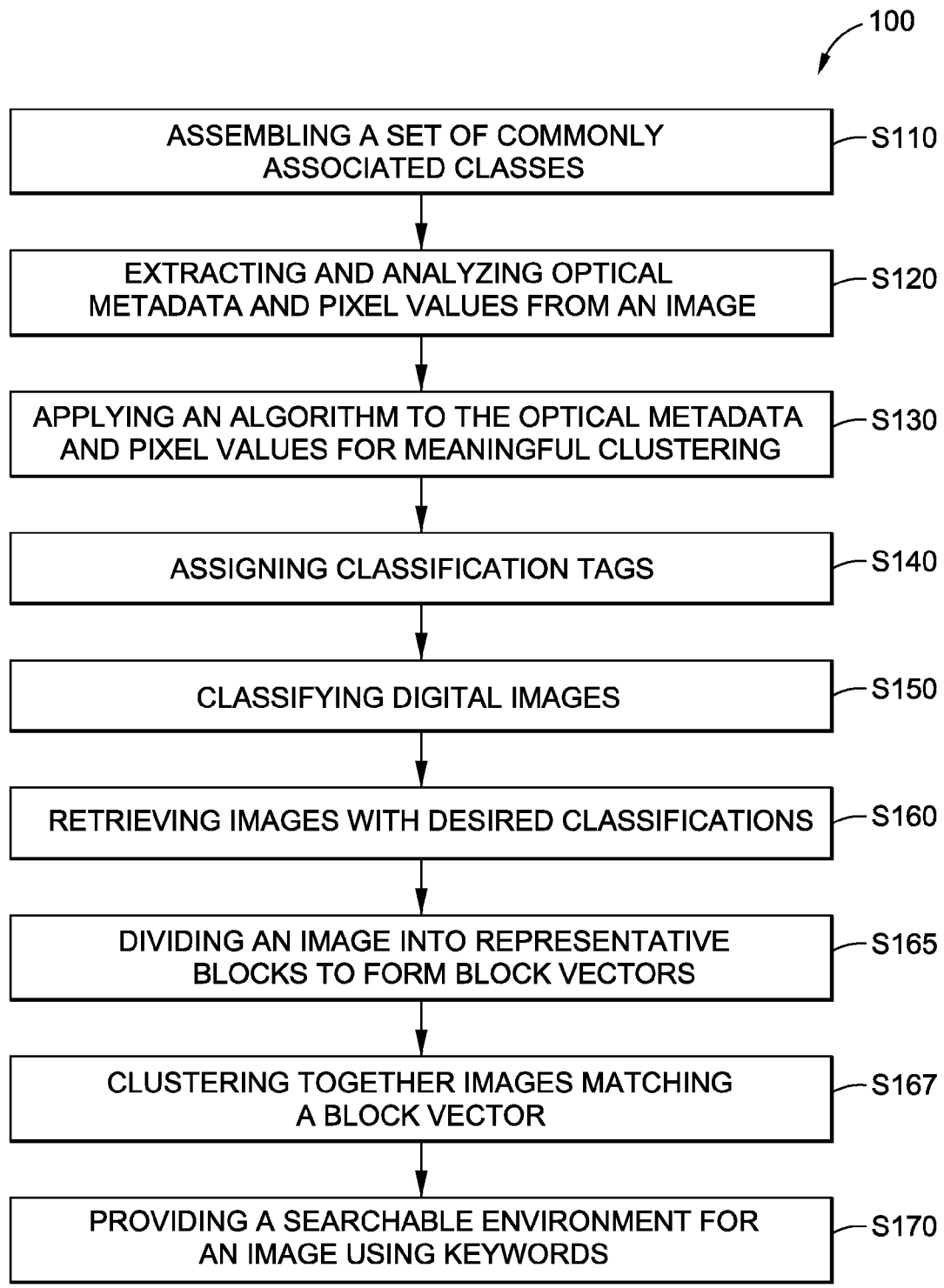
FIG. 17 schematically represents a series of steps involved in a method for classifying digital photo images, according to another embodiment of the invention.

FIG. 17 schematically represents a series of steps involved in a method 100 for classifying digital images using optical parameters according to another embodiment of the invention, wherein step 110 may involve assembling a set of commonly associated classes. The classes may be formed generally as described hereinabove, for example, with reference to FIG. 12 and Table 1.

As a non-limiting example, a set of commonly associated classes may be formed using the results of a human induced feedback, for example a survey.

Step 120 may involve extracting and analyzing optical meta data and pixel values from an image file selected from a database of input photos. As a non-limiting example, information such as exposure time, focal length, f-numbers, and flash presence (FIG. 4) may be analyzed for optical characteristics and the results stored.

Figure 6:
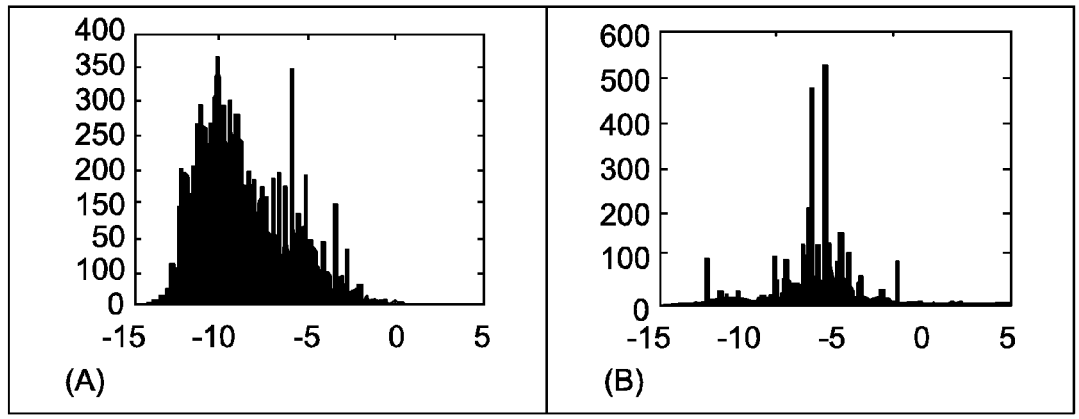
FIG. 6 is a series of graphs showing the distribution of Log light metric for images without flash (a) and with flash (b)

Step 130 may involve applying an algorithm to the optical metadata and pixel values to predict probable grouping (meaningful clustering) with other image files having similar measurements. For example, FIGS. 6, 7, and 9 depict clustering of images based on Gaussians of similar ambient light characteristic results.

Step 140 may involve assigning classification tags to image files to map probable class tags based on results of algorithms such as those in Step 130. With reference to FIG. 12, one exemplary mapping model depicts various cluster groups associated with a sample of human induced classes.

Step 150 may involve classifying digital images according to a set of associated classes using classification tags such as those in Step 140. With reference to FIGS. 14 and 15, digital images may be assigned multiple tags and classified into multiple classifications when image elements satisfy a probable relation to the various classifications.

Step 160 may involve retrieving images with desired classifications within a probability of being related to a query word. Referring to FIG. 13, a Bayesian model may be used to assign a word to an image using a probability equation based on content and contextual information. As described hereinabove, probability algorithms may be used to retrieve images satisfying a cutoff value. Optional Step 165 divides an image into representative blocks of pixel features and optical content text information where blocks within a probability cutoff are formed into block vectors. Optional Step 167 then clusters together images within a maximum probability value for a word matching the block vector. Optional Step 170 provides a searchable environment for an image using keywords that satisfy the probability value on Step 167.

Thus, while the optical meta layer constitutes only a few bytes of information in a standard 3-4 MB digital camera photo, these bytes contain hidden information about the content of the other layers (Pixel and Human Induced). Further they can be easily extracted and processed without too much computational cost. Although the invention has been described primarily with respect to the optical meta layer to generate inferences among digital images, the present invention is not meant to be limited in this respect. For instance, the information from a human induced meta layer (if available) can also help boost the inferences derived from the optical meta layers. Additionally, the inferences in the derived meta layer may be obtained from the joint distribution of optical, temporal, human induced meta layers.

It should be understood, of course, that the foregoing relates to exemplary embodiments of the invention and that modifications may be made without departing from the spirit and scope of the invention as set forth in the following claims.

We claim:

1. A method for classifying digital images, comprising:
hierarchically clustering the digital images into a set of meaningful clusters based on at least two levels of clustering optical parameters, including:
clustering the digital images based on determined light content of the digital images and
clustering the digital images based on depth of field associated with the digital images;
associating the set of meaningful clusters to a set of associated classes used by a user; and
classifying the digital images according to the set of associated classes.

2. The method for classifying digital images of claim 1, further comprising:
analyzing the optical parameters for context information and content information.

3. The method for classifying digital images of claim 1, further comprising:
automatically annotating each digital image with a set of text for further classification.

4. The method for classifying digital images of claim 1, wherein:
the optical parameters are gathered from EXIF data attached to metadata of the digital images.

5. The method for classifying digital images of claim 1, further comprising:
determining an associated classification for each of the digital images based on the probability that a block vocabulary and a word vocabulary apply.

6. The method for classifying digital images of claim 5, further comprising:
retrieving digital images searched by a query tag based on the word vocabulary.

7. The method for classifying digital images of claim 1, further comprising:
retrieving images having a tag a probability higher than a predetermined cutoff.

8. A method for organizing digital images, comprising:
deriving optical parameters from the digital images;
determining a visual cue in the digital images based on depth of field associated with the digital images;
accessing a set of subject classes commonly used by a user and assembled into predefined parameters;

determining a semantic concept for the digital image by associating the visual cue with the set of digital image subject classes; and organizing the digital images into classifications according to the associations determined by the visual cue.

9. The method for organizing digital images of claim 8, further comprising:

automatically annotating the digital images by associating the classifications with tags.

10. The method for organizing digital images of claim 8, further comprising:

analyzing the optical parameters for context information and content information.

11. The method for organizing digital images of claim 8, further comprising:

retrieving images having a tag corresponding to a query tag, where the tag has a probability higher than a predetermined cutoff.

12. The method for organizing digital images of claim 8, further comprising:

determining an associated classification for each of the digital images based on the probability that a block vocabulary and a word vocabulary apply.

13. The method for organizing digital images of claim 12, further comprising:

retrieving digital images searched by a query tag using the block vectors associated with the probability that the block vocabulary and the word vocabulary apply.

14. The method for organizing digital images of claim 8, further comprising:

manually assigning text tags to images according to the classifications the images are associated with.

15. A method for using optical metadata of a digital image to classify the digital image, the method comprising:

analyzing the optical metadata to cluster the digital image with other digital images having similar optical concepts based on indicators of light content and depth of field in the optical meta data of the digital image;

comparing the cluster with human induced labeled images having similar optical concepts based on indicators of light content and depth of field associated with the human induced labeled images; and corresponding the human induced labeled images with a classification for the digital image.

16. The method of claim 15, further comprising:

automatically annotating the digital image by associating the classification with a tag.

17. The method of claim 16, wherein:

the automatic annotation includes associating the digital image by classification according to extracted optical context data from the optical metadata.

18. The method of claim 15, further comprising:

retrieving images having a tag corresponding to a query tag, where the tag has a probability higher than a predetermined cutoff.

* * * * *

UNITED STATES PATENT AND TRADEMARK OFFICE
CERTIFICATE OF CORRECTION

| | | |
|---|---|---|
| PATENT NO. | : 8,094,948 B2 | |
| APPLICATION NO. | : 12/110065 | |
| DATED | : January 10, 2012 | |
| INVENTOR(S) | : Jain et al. | |

It is certified that error appears in the above-identified patent and that said Letters Patent is hereby corrected as shown below:

Page 2, item (56), under "Other Publications", in Column 1, Lines 6-7, delete "DVMMIab–Columbia University. Visualseek–a joint spaital-feature" and insert -- DVMMLab–Columbia University. Visualseek–a joint spatial-feature --.

Page 2, item (56), under "Other Publications", in Column 1, Line 30, delete "Comit" and insert -- Comite --.

Page 2, item (56), under "Other Publications", in Column 2, Line 8, delete "photoghs" and insert -- photographs --.

Page 2, item (56), under "Other Publications", in Column 2, Line 18, delete "Classification.In" and insert -- Classification. In --.

Page 2, item (56), under "Other Publications", in Column 2, Line 24, delete "Annotationsfor" and insert -- Annotations for --.

Page 2, item (56), under "Other Publications", in Column 2, Line 26, delete "Hierarcical" and insert -- Hierarchical --.

Page 2, item (56), under "Other Publications", in Column 2, Line 32, delete "Speci_cation," and insert -- Specification, --.

Page 2, item (56), under "Other Publications", in Column 2, Line 37, delete "managemet" and insert -- management --.

Page 2, item (56), under "Other Publications", in Column 2, Line 42, delete "www._ickr.com/." and insert -- www.flickr.com/. --.

Column 16, line 30, in Claim 1, delete "images and" and insert -- images; --.

Signed and Sealed this
Tenth Day of July, 2012

David J. Kappos
*Director of the United States Patent and Trademark Office*

CERTIFICATE OF CORRECTION (continued)
U.S. Pat. No. 8,094,948 B2

Column 16, line 60, in Claim 7, delete "having a tag a probability" and insert -- having a tag with a probability --.

Column 17, lines 27-28, in Claim 13, delete "using the block" and insert -- using block --.

Column 18, line 10, in Claim 15, delete "meta data" and insert -- metadata --.